(12) United States Patent
Lewis et al.

(10) Patent No.: US 6,412,308 B1
(45) Date of Patent: Jul. 2, 2002

(54) LIQUID COOLING OF GLASSWARE MOLDS

(75) Inventors: David L. Lewis; David L. Hambley, both of Sylvania, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/400,123

(22) Filed: Sep. 20, 1999

(51) Int. Cl.[7] .................................................. C03B 9/14
(52) U.S. Cl. ...................... 65/267; 65/29.11; 65/29.19; 65/319; 65/355; 65/356; 65/374.12; 425/552; 249/79; 249/80; 249/81
(58) Field of Search .............................. 65/29.11, 29.19, 65/267, 319, 356, 355, 374.12; 425/552; 249/79, 80, 81

(56) References Cited

U.S. PATENT DOCUMENTS

| | | | | |
|---|---|---|---|---|
| 1,600,195 A | * | 9/1926 | Peiler ........................... | 249/79 |
| 1,798,136 A | | 3/1931 | Barker, Jr. | |
| 2,508,891 A | | 5/1950 | Rowe | |
| 2,744,358 A | | 5/1956 | Rowe | |
| 3,020,594 A | * | 2/1962 | Makowski .................... | 249/79 |
| 3,499,776 A | | 3/1970 | Baak et al. | |
| 3,731,650 A | | 5/1973 | Schweikert et al. | |
| 3,810,747 A | * | 5/1974 | Bork ........................... | 65/356 |
| 3,844,753 A | * | 10/1974 | Huebner ...................... | 249/79 |
| 3,887,350 A | | 6/1975 | Jenkins | |
| 4,009,017 A | * | 2/1977 | Jones ........................... | 65/319 |
| 4,070,174 A | * | 1/1978 | Nebelung et al. ............. | 65/355 |
| 4,082,527 A | * | 4/1978 | Jones et al. ................... | 65/356 |
| 4,140,512 A | | 2/1979 | Carmi et al. | |
| 4,142,884 A | | 3/1979 | Jones, Jr. | |
| 4,251,253 A | | 2/1981 | Becker et al. | |
| 4,313,751 A | | 2/1982 | Torok | |
| 4,578,104 A | | 3/1986 | Jones | |
| 4,657,573 A | * | 4/1987 | Jones ........................... | 65/355 |
| 4,657,574 A | * | 4/1987 | Foster ........................... | 65/319 |
| 4,824,461 A | | 4/1989 | Cavazos | |
| 4,884,961 A | * | 12/1989 | Iizuka et al. ................... | 249/79 |
| 5,167,688 A | | 12/1992 | Cavazos | |
| 5,656,051 A | | 8/1997 | Mares-Benavides | |

FOREIGN PATENT DOCUMENTS

| | | |
|---|---|---|
| EP | 0078665 | 5/1983 |
| FR | 2237156 | 7/1973 |
| FR | 2346294 | 12/1975 |
| FR | 2260076 | 1/1978 |
| GB | 2060603 | 7/1983 |
| JP | 55-18563 | * 2/1980 |
| WO | 9903789 | 1/1999 |

OTHER PUBLICATIONS

Hanrez–Belgium Patent Application (translation) "Molding Structure having Continuously Adjustable Thermal Resistance" (1980).

Ductile Iron Data for Design Engineers (1990) p. 134 and 5–1 to 5–18.

* cited by examiner

Primary Examiner—Michael Colaianni

(57) ABSTRACT

A glassware forming mold that includes a body of heat conductive construction having a central portion with a forming surface for shaping molten glass and a peripheral portion spaced radially outwardly of the central portion. A plurality of coolant passages extend in a spaced array through the peripheral portion of the mold body, and liquid coolant is directed through such passages for extracting heat from the body by conduction from the forming surface. A plurality of openings extend axially into the body radially between at least some of the liquid coolant passages and the forming surface for retarding heat transfer from the forming surface to liquid coolant in the passages.

48 Claims, 7 Drawing Sheets

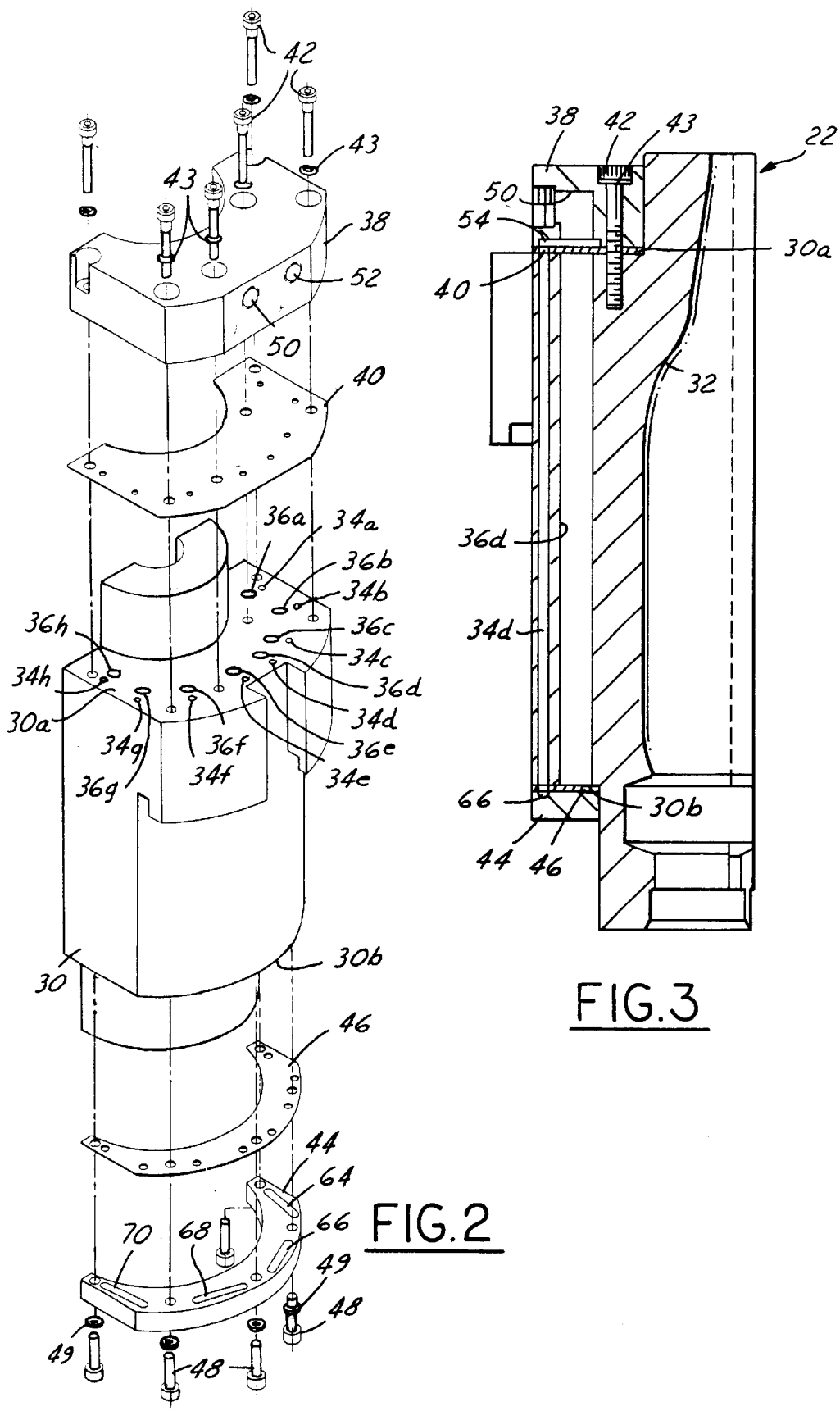

LIQUID COOLING OF GLASSWARE MOLDS

The present invention is directed to cooling of molds in a glassware forming machine, and more particularly to liquid cooling of the blank molds and/or blow molds in an individual section machine.

BACKGROUND AND OBJECTS OF THE INVENTION

The science of glass container manufacture is currently served by the so-called individual section or IS machine. Such machines include a plurality of separate or individual manufacturing sections, each of which has a multiplicity of operating mechanisms for converting one or more charges or gobs of molten glass into hollow glass containers and transferring the containers through successive stations of the machine section. Each machine section includes one or more blank molds in which a glass gob is initially formed in a blowing or pressing operation, one or more invert arms for transferring the blanks to blow molds in which the containers are blown to final form, tongs for removing the formed containers onto a deadplate, and a sweepout mechanism for transferring molded containers from the deadplate onto a conveyor. U.S. Pat. No. 4,362,544 includes a background discussion of both blow-and-blow and press-and-blow glassware forming processes, and discloses an electropneumatic individual section machine adapted for use in either process.

In the past, the blank and blow molds of a glassware forming machine have generally been cooled by directing air onto or through the mold parts. Such techniques increase the temperature and noise level in the surrounding environment. Furthermore, productivity is limited by the ability of the air to remove heat from the mold parts in a controlled process, and process stability and container quality are affected by the difficulty in controlling air temperature and flow rate. It has been proposed in U.S. Pat. No. 3,887,350 and 4,142,884, for example, to direct a fluid, such as water, through passages in the mold sections to improve heat extraction. However, heat extraction by liquid cooling can be too rapid and uncontrolled, at least in some areas of the mold, so steps must be taken to retard heat transfer from the inner or forming surface of a mold section to the outer periphery in which the liquid cooling passages are disposed. Various techniques for so controlling liquid-cooling heat extraction have been proposed in the art, but have not been entirely satisfactory.

Mold material for manufacture of quality glassware must have the following characteristics: good wear properties, good thermal cycle resistance to cracking, good mechanical properties, good glass release properties, ease of machinability, ease of repair and economic feasibility. Ductile iron, which is defined as an iron in which free microstructural graphite is in the form of spheres, has been proposed for use as a mold material to manufacture glassware in which reduced thermal conductivity (as compared to gray iron for example) is desired. Specific examples of glassware in which ductile iron is employed as the mold material are small containers that require a small amount of heat removal in the mold equipment, such as cosmetic and pharmaceutical bottles. However, ductile iron has not been employed in manufacture of larger glassware because of its reduced heat transfer and thermal cycle resistance capabilities. Ni-Resist ductile iron has been proposed for glassware manufacture. The increased nickel content of Ni-Resist ductile iron contributes to improved glass release properties. However, standard austenitic Ni-Resist ductile iron does not exhibit desired thermal conductivity and resistance to thermal cyclic cracking.

It is therefore a general object of the present invention to provide a glassware forming mold, and a method of cooling such a mold, that improve temperature control stability at the mold forming surface. Another and more specific object of the present invention is to provide a mold and method of cooling in which mold surface temperature can be adjusted and dynamically controlled during the glassware forming operation. Yet another object of the present invention is to provide a mold and method of cooling in which more uniform temperature and temperature control are obtained both circumferentially and axially of the mold forming surface to tailor the overall heat transfer characteristics of the mold coolant system to achieve efficient glass forming. Yet another object of the present invention is to provide a mold cooling technique that is characterized by reduced corrosion in the cooling passages and improved operating life of the entire mold and cooling system. A further object of the invention is to provide a material for construction of a glassware mold, including either a blank mold or a blow mold, that exhibits the desirable mold properties listed above.

SUMMARY OF THE INVENTION

A glassware forming mold in accordance with presently preferred embodiments of the invention includes at least one body of heat conductive construction having a central portion with a forming surface for shaping molten glass and a peripheral portion spaced radially outwardly of the central portion. At least one passage extends through the peripheral portion of the mold, and liquid coolant is directed through the passage for extracting heat from the body by conduction from the forming surface. At least one opening is provided in the mold body extending into the body and positioned radially between the coolant passage and the forming surface for retarding heat transfer from the surface to liquid coolant in the passage. The mold preferably comprises a split mold having a pair of mold bodies with identical arrays of passages and openings. The mold may be either a blank mold or a blow mold.

In the disclosed embodiments of the invention, the openings have a depth into the body, either part way or entirely through the body, coordinated with contour of the forming surface and other manufacturing parameters to control heat transfer from the forming surface to the coolant passages. The openings may be wholly or partially filled with material for further tailoring heat transfer from the forming surface to the coolant passages. In a mold body having a plurality of coolant passages and a plurality of openings, the heat transfer properties of the openings may be tailored circumferentially around the mold body, such as by partially filling every other passage. Thus. the heat transfer characteristics of the mold body can be tailored both radially, axially and circumferentially of the mold to obtain desired heat transfer and forming surface temperature characteristics.

Endplates may be carried by the mold body for controlling flow of coolant in multiple passes through the coolant passages in the mold body. In the preferred embodiments of the invention, one of the endplates contains a fluid inlet and a fluid outlet, and channels for directing the fluid to the mold passages. The other endplate contains channels for routing fluid from the end of one coolant passage to the end of an adjacent passage. In the disclosed embodiments of the invention, liquid coolant makes four passes through the mold body before returning to the fluid sump. The number of passes through the mold body may vary upwardly and downwardly depending upon mold size, the amount of heat to be extracted, etc. It is also anticipated that the number of coolant passes for cooling a blank mold will be less than for a blow mold.

In accordance with yet another feature of the present invention, the liquid coolant comprises water, preferably mixed with a heat transfer fluid such as propylene glycol. Other heat transfer fluids include silicon-based heat transfer fluids, synthetic organic fluids, and inhibited glycol-based fluids. The coolant fluid control system preferably includes facility for detecting and controlling coolant composition (e.g., propylene glycol concentration), coolant temperature and coolant flow rate, and an electronic controller for controlling composition temperature and/or flow rate to achieve optimum cooling and temperature control at the mold forming surfaces. In this way, mold surface temperature can be dynamically adjusted and controlled.

In accordance with a further feature of the present invention, which may be employed either separately from or more preferably in combination with other features of the invention, the mold body or bodies are constructed of austenitic Ni-Resist ductile iron. Such ductile iron is preferably a Type D Ni-Resist ductile iron in accordance with ASTM-A439-84, but modified to possess increased silicon and molybdenum content. Type D2-C iron is currently employed. Silicon content is preferably in excess of 3.0%, and most preferably is 4.20%±0.20%. Molybdenum content is preferably in excess of 0.5%, and most preferably 0.70±0.10%. (All composition percentages in this application are in weight percent.) The increased silicon content decreases the thermal conductivity of the mold material. The increased molybdenum content improves thermal cycle resistance to cracking. The increased nickel content characteristic to Ni-Resist materials improves glass release properties. The austenitic Ni-Resist ductile iron mold composition in accordance with this aspect of the invention also yields desirable wear and other mechanical properties, ease of machinability and repair, and desirable economic feasibility. Austenitic ductile Ni-Resist material also provides a more stable microstructure than gray iron, for example, up to a temperature of 1400° F.

A method of cooling a mold for a glassware forming machine in accordance with yet another aspect of the present invention contemplates providing a mold body of heat conductive construction having a forming surface, at least one coolant passage extending axially through the body, and at least one opening that extends at least part way through the body. The opening is disposed radially between the coolant passages and the mold forming surface. Liquid coolant is circulated through the passages. Heat transfer from the forming surface to the coolant is controlled in part by controlling diameter and depth of the opening, and by optionally at least partially filling the opening to modify the heat transfer characteristics across the opening. In the preferred embodiments of the invention, at least one, and preferably all of composition, temperature and flow rate of the liquid coolant are controlled.

BRIEF DESCRIPTION OF THE DRAWINGS

The invention, together with additional objects, features and advantages thereof, will be best understood from the following description, the appended claims and the accompanying drawings in which:

FIG. 2 is an exploded perspective view of one of the split mold segments or parts in FIG. 1;

FIG. 3 is a sectional view of one of the split mold parts in FIG. 1;

DETAILED DESCRIPTION OF PREFERRED EMBODIMENTS

Figure 1:
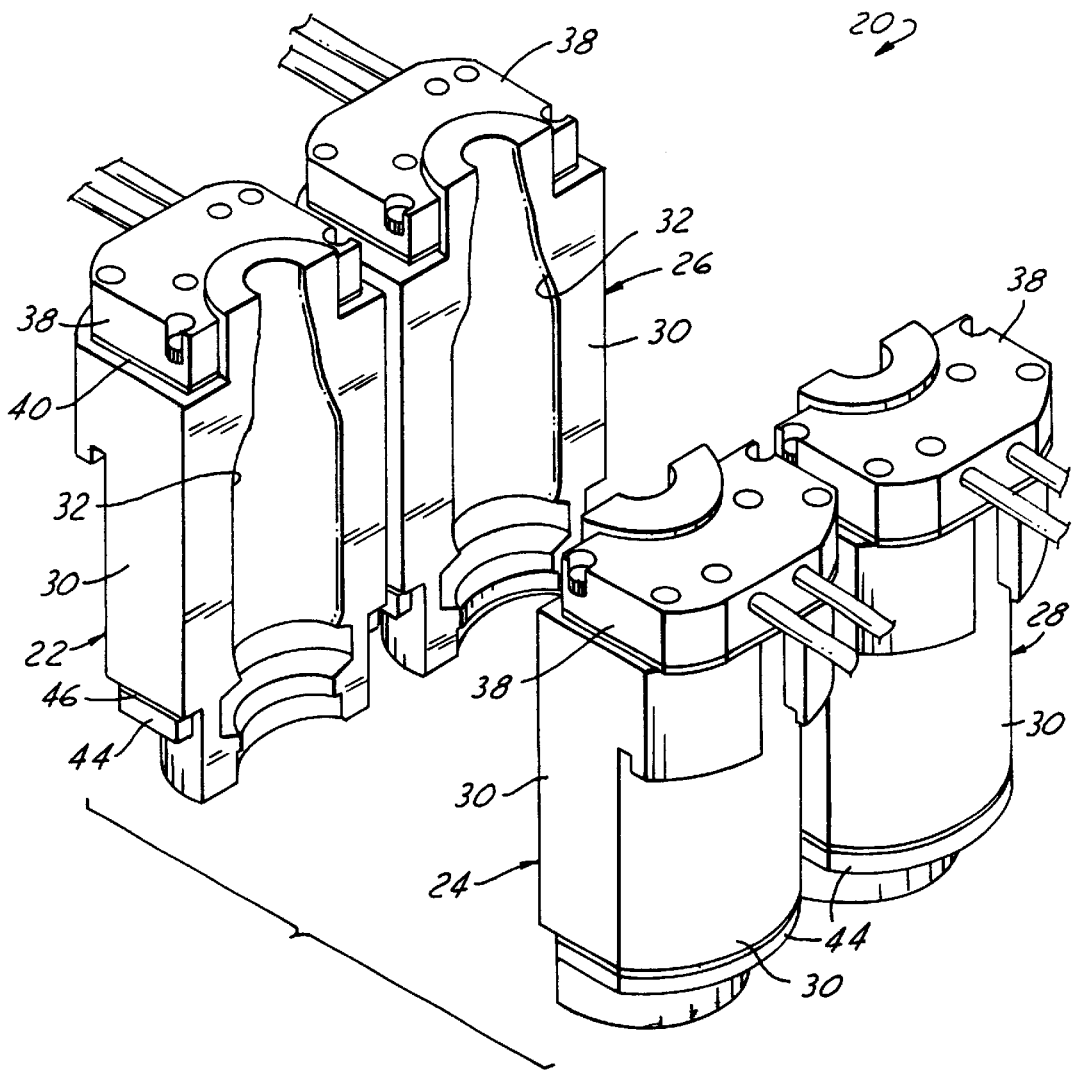
FIG. 1 is a perspective schematic diagram of a pair of liquid-cooled split molds in accordance with one presently preferred embodiment of the invention.

FIG. 1 illustrates a mold system 20 as comprising a first pair of split mold parts 22, 24 and second pair of split mold parts 26, 28. The specific mold parts 22–28 illustrated comprise blow molds in a dual IS machine. However, the invention is equally useful in conjunction with the cooling of blank molds (FIG. 16), and in conjunction with other types of IS or rotary machines, such as single, triple and quad machines. Each mold part 22–28 comprises a mold body and opposed endplates. Mold part 22 will be discussed in detail in connection with FIGS. 2–7 and 17, it being understood that mold part 26 is identical to mold segment 22, and mold parts 24, 28 are the mirror image of mold part 22.

Figure 17:
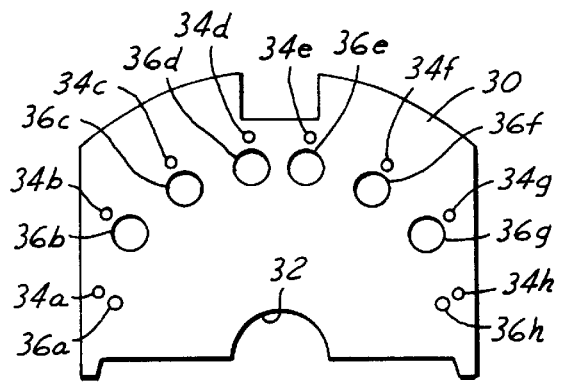
FIG. 17 is a top plan view of the mold body in the embodiment of FIGS. 2 and 3.

Mold part 22 includes a mold body 30 having a central portion with a forming surface 32 that, together with the corresponding surface of opposed mold part 24, forms the surface against which molten glass is shaped in a pressing or blowing operation. The molten glass thus makes contact with surface 32, transferring heat energy at surface 32 into body 30, which must be dissipated. Mold body 30 also includes a peripheral portion spaced radially outwardly from the central portion in which forming surface 32 is disposed. A plurality of passages extend axially in a circumferentially spaced parallel array through the peripheral portion of mold body 30. In the embodiment illustrated, there are eight such passages 34a–34h, which are angularly spaced from each other. The angular spacing between passages 34a–34h may be approximately equal increments, but would normally be in unequal increments because of non-symmetries in the mold body. Each passage 34a–34h in FIGS. 3 and 17 is of cylindrical contour and of uniform diameter throughout its length, being entirely open from the top mold body surface 30a to the bottom mold body surface 30b. Positioned radially inwardly of each passage 34a–34h is a corresponding opening 36a–36h. In the embodiment of FIGS. 1–3 and 11, openings 36a–36h extend entirely axially through body 30 from surface 30a to surface 30b, and are respectively positioned radially inwardly of the corresponding passage 34a–34h.

Mold body 30 is preferably constructed of austenitic Ni-Resist ductile iron in accordance with another aspect of the present invention. Ni-Resist ductile iron is a ductile iron that has a high nickel content, typically in excess of 18%, and more preferably in excess of 21%. A presently preferred composition is a Type D2-C ductile Ni-Resist composition generally in accordance with ASTM-A439-84, but modified to possess increased silicon and molybdenum contents. The following table illustrates chemical composition of this preferred material:

TABLE I

CHEMICAL COMPOSITION

|  |  | Target | Range |
|---|---|---|---|
| Carbon | (%) | 2.80 | ±0.20 |
| Silicon | (%) | 4.20 | ±0.20 |
| Manganese | (%) | 2.10 | ±0.30 |
| Magnesium | (%) | 0.050 | ±0.010 |
| Nickel | (%) | 22.50 | ±1.50 |
| Sulphur | (%) | 0.010 | ±0.006 |
| Chrome | (%) | 0.00 | ±0.50 |
| Phosphorus | (%) | 0.00 | ±0.08 |
| Molybdenum | (%) | 0.70 | ±0.10 |
| Iron |  | (Balance) |  |

This material has low thermal conductivity, good corrosion resistance, good machinability and economy, and good glass release properties at the mold surface. The increased silicon content decreases thermal conductivity, while the increased molybdenum content resists thermal cyclic cracking.

Figure 4:
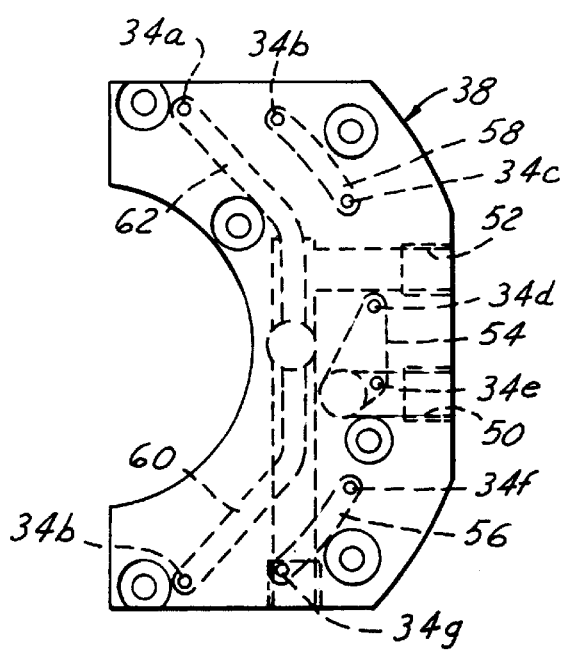
FIG. 4 is a top plan view of the upper endplate in the mold part assembly of FIGS. 1–3.
Figure 5:
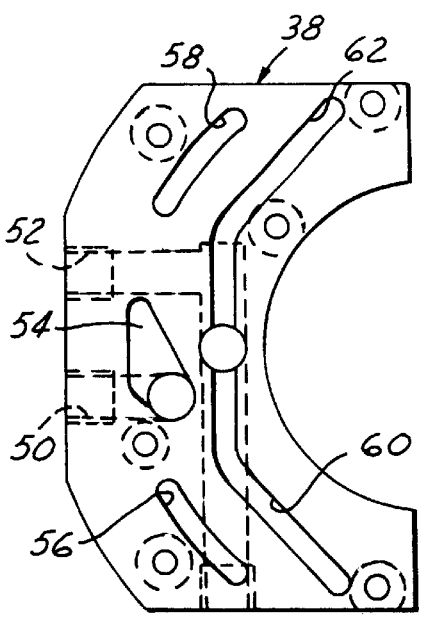
FIG. 5 is a bottom plan view of the upper endplate illustrated in FIG. 4.
Figure 6:
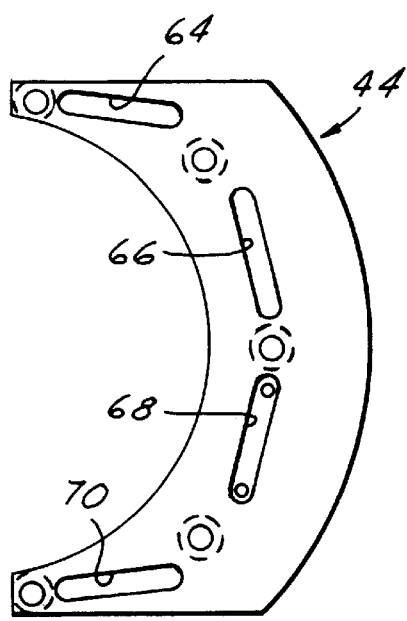
FIG. 6 is a top plan view of the lower endplate in the mold part assembly of FIGS. 1–3.
Figure 7:
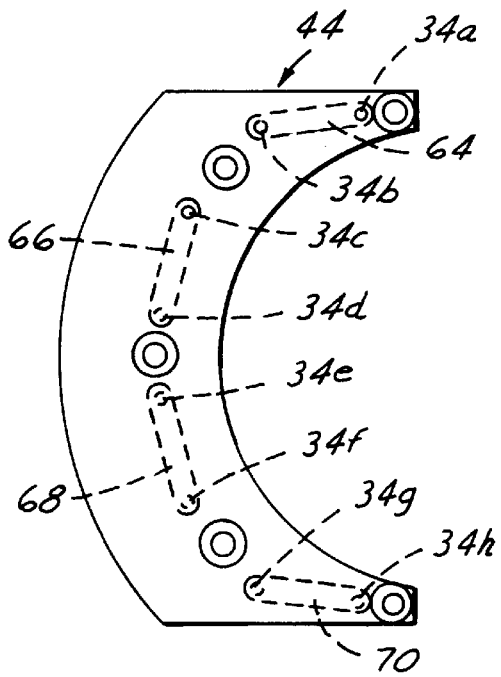
FIG. 7 is a bottom plan view of the lower endplate in FIG. 6.

Surfaces 30a, 30b are parallel to each other, being formed by associated parallel ledges on mold body 30. An upper endplate 38 and an intervening gasket 40 are carried on surface 30a, being secured to mold body 30 by a plurality of screws 42 and spring washers 43. A lower endplate 44 and an intervening gasket 46 are secured to surface 30b by a corresponding plurality of screws 48 and spring washers 49. (The screw holes are not illustrated in FIG. 11 to highlight the relationship between passages 34a–34h and openings 36a–36h.) Upper endplate 38 (FIGS. 3–5) is arcuate, and has a radially opening inlet port 50 and a radially opening outlet port 52. Inlet port 50 opens to a triangular-shaped cavity 54 on the underside of plate 38. There are an angularly spaced pair of arcuate or chordal channels 56, 58 on the underside of plate 38, and a second pair of channels 60, 62 are formed on the underside of plate 38 in communication with outlet port 52. The angularly spaced ends of channels 62 and 58, pocket 54 and channels 56, 60 overlie the angularly spaced ends of coolant passages 34a–34h in assembly to the mold body, as illustrated in FIG. 4. Lower endplate 44 (FIGS. 3 and 6–7) is likewise of arcuate contour, having an upper face in abutment through gasket 46 with surface 30b of the mold body. Four arcuate or chordal channels 64, 66, 68, 69 are formed on the upper face of lower endplate 44. In assembly, the angularly spaced ends of these channels underlie the angularly spaced ends of mold coolant passages 34a–34h, as best seen in FIG. 7. It will be noted in FIGS. 4 and 7 that the channels in the endplates are wider than the passages in the mold body. This accommodates slight misalignment due to tolerance variation or differential thermal expansion.

In use, inlet port 50 of upper endplate 38 is connected to a source of liquid coolant under pressure, and outlet port 52 is connected to a coolant return line. Coolant is thus routed from inlet port 50 and inlet pocket 54 downwardly (in the orientation of FIG. 3) through passages 34d and 34e to lower endplate 44, thence by endplate 44 upwardly through passages 34c and 34f, thence by endplate 38 downwardly through passages 34b and 34g, and thence by endplate 44 upwardly through passages 34a, 34h and endplate channels 60, 62 to outlet port 52. The cooling liquid thus makes a total of four passes through the mold body before return to the sump. The number of passes may be tailored in accordance with the principles of the invention to achieve the desired thermal gradient across the mold/coolant interface using suitable conventional computer modeling techniques. Openings 36a–36h retard heat transfer from forming surface 32 to coolant passages 34a–34h and thus control the overall heat transfer rate from the glass to the coolant. In the embodiment of the invention illustrated in FIGS. 3 and 11, passages 36a–36h extended entirely through the mold body at uniform diameter and substantially equal angular spacing. The upper and lower ends of the several passages 36a–36h are blocked by gaskets 40, 46, as best seen in FIG. 3. Openings 36a–36h thus form closed air pockets with lower heat transfer properties than the metal of the mold, and thus serve partially to retard and control heat transfer to the coolant passages by interrupting the heat transfer path. (Openings 36a, 36h are illustrated as being of lesser diameter in FIG. 11 because of the need to accommodate endplate mounting holes, as best seen in FIGS. 4–7.)

Figure 18:
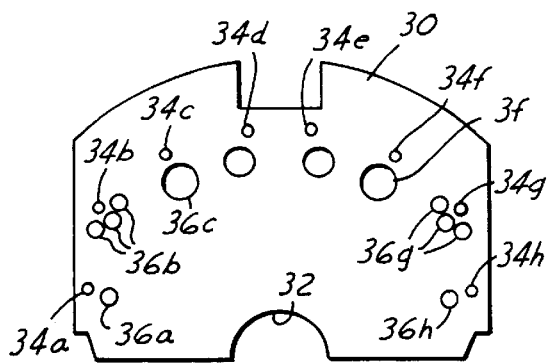
FIGS. 18–20 are top plan views similar to that of FIG. 11 but showing respective modified embodiments.
Figure 19:
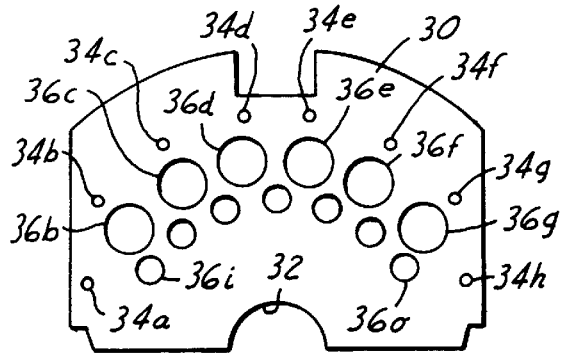

The number and position of openings 36a–36h are selected in accordance with desired heat transfer characteristics. For example, FIG. 18 illustrates a modification in which openings 36b, 36g are replaced by several smaller openings disposed between coolant passages 34b, 34g and forming surface 32. FIG. 19 illustrates the use of supplemental openings 34i–34o between coolant passages 34a–34h and forming surface 32 further to restrict heat transfer from the forming surface to the coolant passages. Thus, while in general openings 36a–36h (and 36i–36o) are disposed radially between the coolant passages and the mold forming surface, precise positioning and size of these openings, as well as a number of openings, are tailored to specific applications for obtaining desired heat transfer characteristics.

Figure 10:
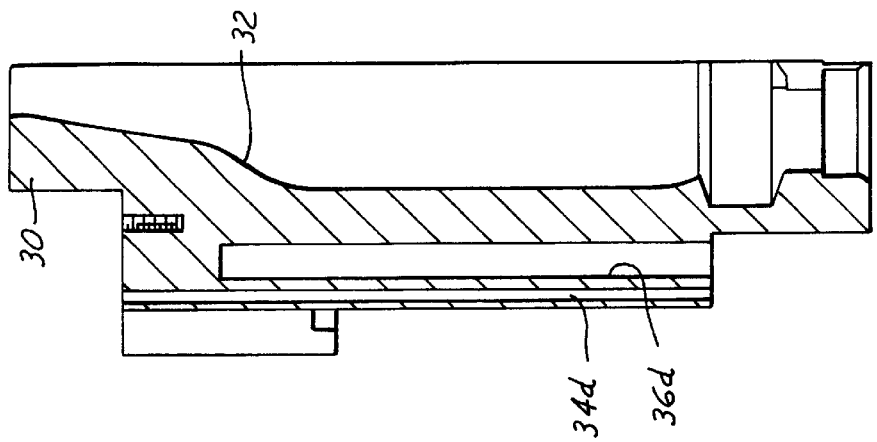
FIGS. 8–12 are schematic diagrams similar to that of FIG. 3 but showing modified embodiments of the invention.
Figure 9:
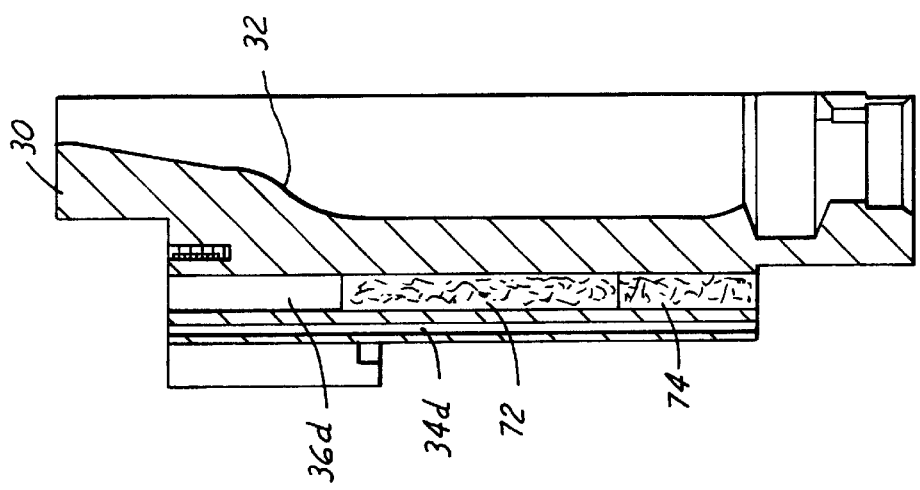
Figure 8:
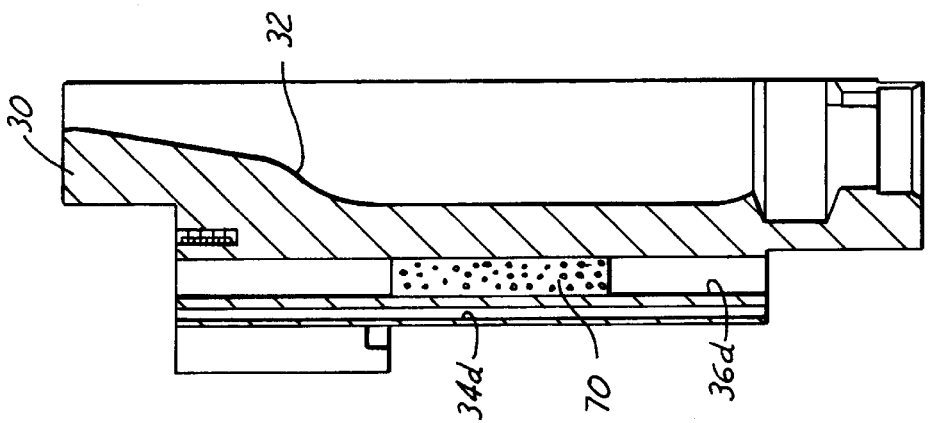
Figure 20:
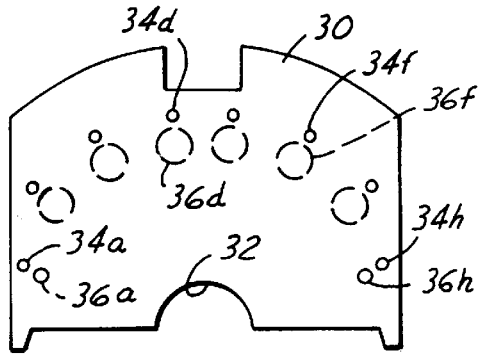

Openings 36a–36h (and 36i–36o) are illustrated as being of uniform diameter throughout their lengths, which facilitates manufacture. In accordance with another feature of the invention illustrated in FIGS. 8–12, these openings may have different heat transfer characteristics along their axial lengths through the mold for further heat transfer control. For example, FIG. 8 illustrates a modification to the embodiment of FIG. 3, in which opening 36d is partially filled with a material 70 of heat transfer characteristics that are different from those of air. For example, material 70 may comprise sand, which effectively forms a filler or plug within opening 36d. This plug of material 70 is illustrated as being positioned about mid-way along the length of the body portion of the container forming surface 32, and thus would conduct greater heat to coolant passage 34d from the mid portion of the container forming surface than would be the case from the upper and lower portions of the container forming surface. Corresponding fillers or plugs 70 may be positioned in the other openings 30a–30c and 30e–30h, or may be positioned in alternate openings, for example. FIG. 9 illustrates a modification in which opening 36d contains a first material plug 72 adjacent to the mid portion of the container forming surface, and a second plug 74 adjacent to the lower portion of the container forming surface at the container heel. Thus, the rate of heat transfer from the lower and mid portions of the container forming surface would be different from the rate of heat transfer at the upper portion of the container forming surface, and would be different from each other, in the modification of FIG. 9. FIGS. 10 and 20 illustrate a modification in which openings 36a–36h extend only part way through the axial length of the mold body. In this modification, heat would be extracted more rapidly from the container neck area than from the container shoulder and body areas of the mold forming surface. The modification of FIGS. 10 and 20 may be employed to provide room for endplate mounting holes without substantially affecting operation. It is generally preferred that heat transfer characteristics be circumferentially uniform.

Figure 12:
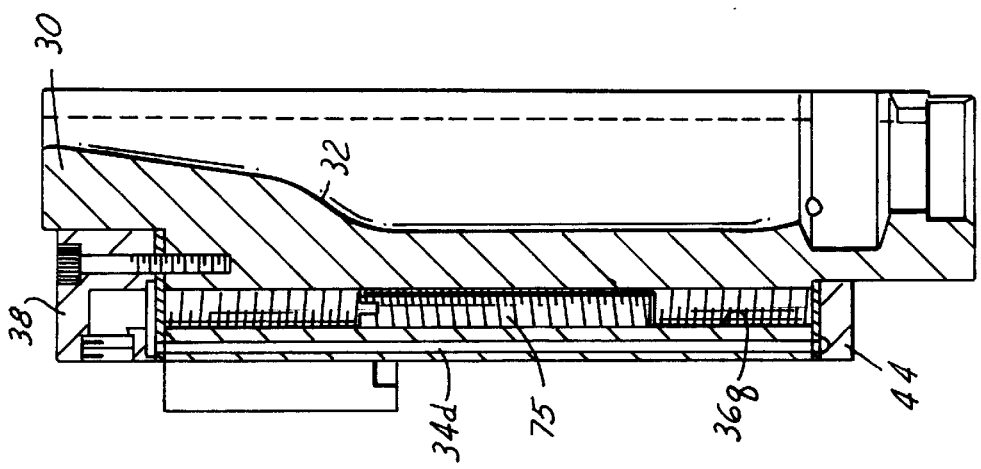
Figure 11:
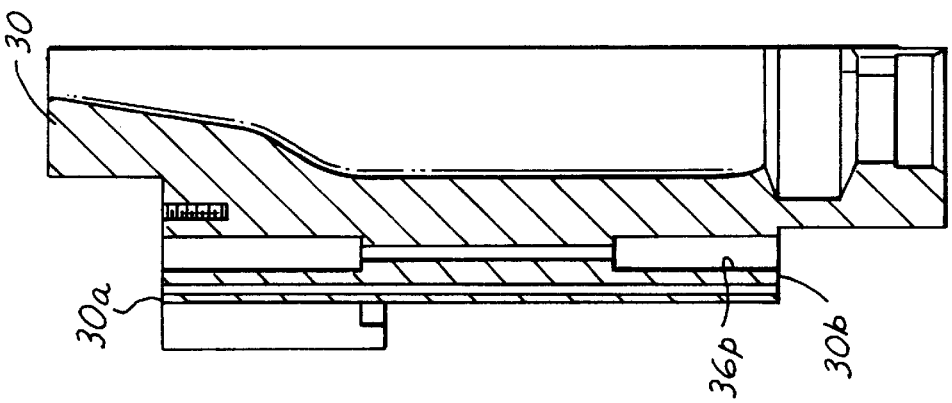

As noted above, all of the embodiments thus far discussed possess openings 36a, etc. of cylindrical contour and uniform diameter. However, other passage geometries are contemplated. For example, FIG. 11 illustrates a mold body 30 in which opening 36p is formed by differential drilling, having end portions of greater diameter and a central portion of lesser diameter. The portion of lesser diameter may extend for a greater length than is illustrated in FIG. 11, and indeed may extend to either the upper or lower surface 30a, 30b. Thus, the embodiment of FIG. 11 achieves greater heat conductivity in the central portion of the mold, as does the embodiment of FIG. 8 for example, but without the use of additional materials. FIG. 12 illustrates another modification, in which the opening 36q is internally threaded and receives an externally threaded plug 75. Once again, plug 75 may be of any desired length, and may be variably positioned within opening 36q. The embodiment of FIG. 12 has the advantage of being adjustable on the manufacturing floor.

Figure 13:
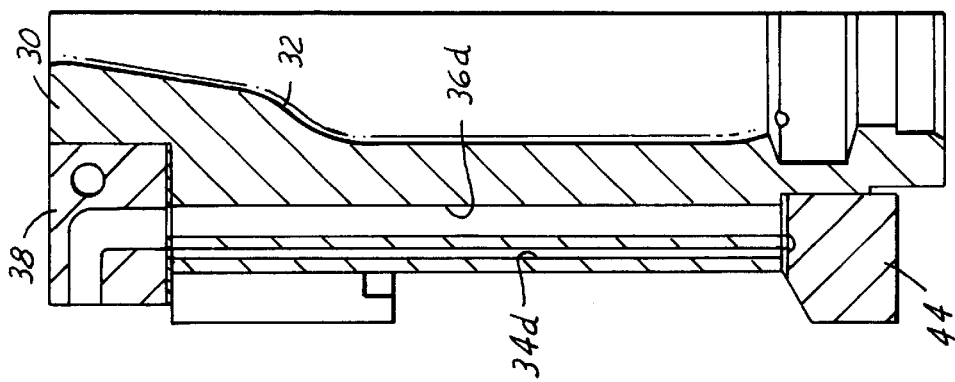
FIGS. 13–15 are schematic diagrams similar to that of FIG. 3 but showing other modified embodiments of the invention.
Figure 16:
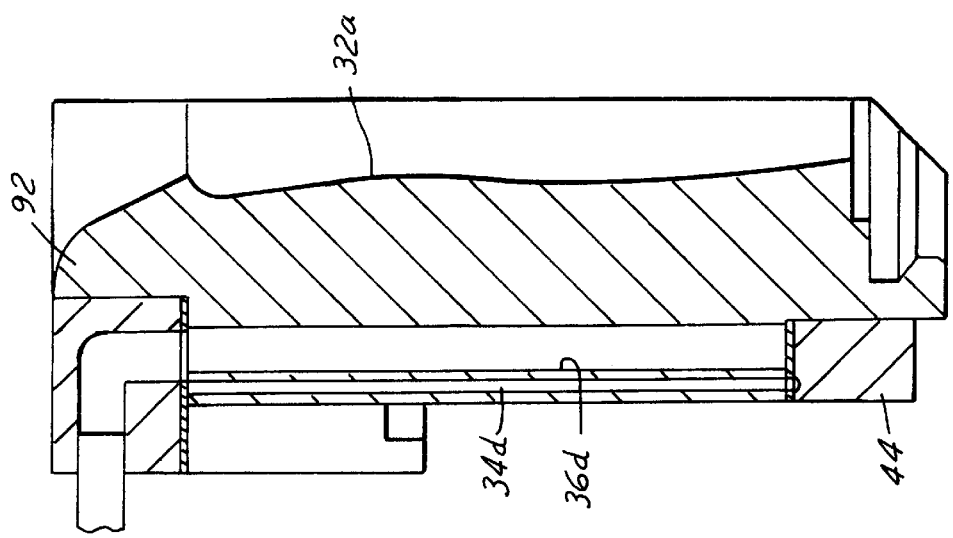
FIG. 16 is a schematic diagram similar to that of FIG. 3 but showing implementation of the invention in connection with a glassware blank mold, as distinguished from the blow molds illustrated in FIGS. 3 and 8–15.
Figure 15:
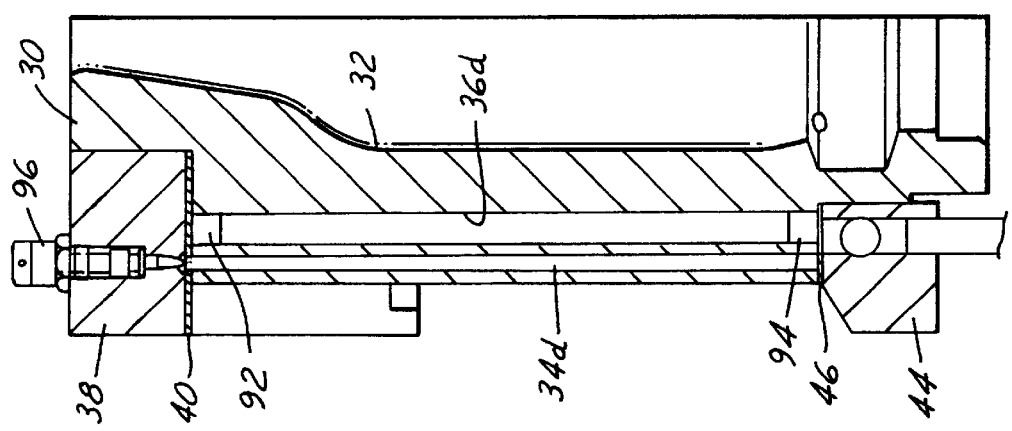
Figure 14:
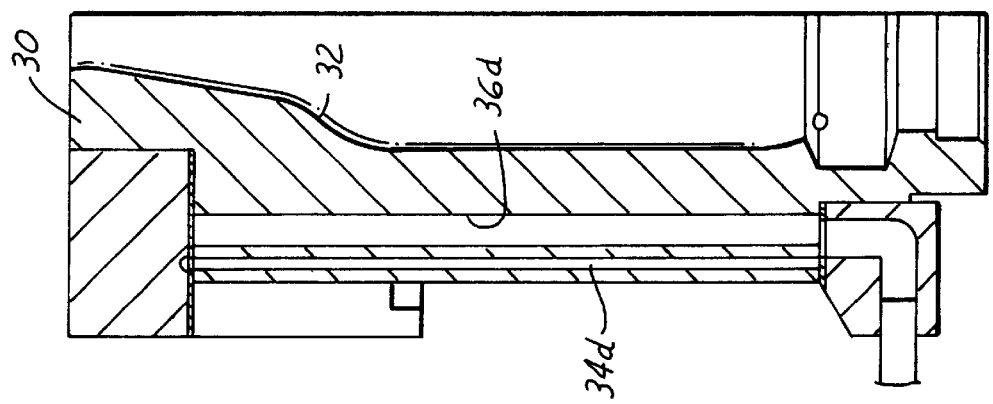

In short, the principles of the present invention provide opportunity for tailoring the heat transfer characteristics of a mold to accommodate any desirable operating conditions or situations. The heat-blocking openings may be positioned between the mold surface and each coolant passage, or between the mold surface and some coolant passages. Heat transfer characteristics of the blocking openings may be tailored both axially and circumferentially of the mold body to achieve any desired differential cooling properties. FIGS. 13–15 illustrate embodiments of the invention in which coolant is introduced and withdrawn at various locations. In FIG. 13, coolant is introduced and withdrawn from the radial direction at the upper end of the mold body, as in FIGS. 1–3. In FIG. 14, coolant is introduced and withdrawn from the radial direction at the lower end of the mold body, while in FIG. 15 the coolant is introduced and withdrawn from the axial direction at the lower end of the mold body. It will be appreciated, of course, that coolant may be introduced, for example, at the upper end of the mold body and withdrawn from the lower end of the mold body in accordance with the principles of the invention. FIG. 16 illustrates application of the present invention in conjunction with a glassware blank mold 91. The principles remain the same as in the above discussions relative to blow molds, although less heat is normally extracted from a blank mold due to the desire to maintain elevated temperature at the glass blank, and consequently fewer coolant passages and heat-blocking openings would normally be provided in conjunction with a blank mold.

FIG. 15 illustrates two additional modifications in accordance with the invention. A pair of plugs 92, 94 close the respective ends of opening 36d in mold body 30. When employing mold bodies which are sufficiently porous that coolant can flow from passage 34d to opening 36d, plugs 92, 94 prevent contact of coolant vapor with gaskets 40, 46. A pair of flow adjustment needles 96 (only one is illustrated) are threadably mounted on plate 38. Each adjustment needle has a needle point that enters a fluid passage channel in plate 38. Needles 96 thus provide for adjustment of resistance to fluid flow at each mold part.

Figure 21:
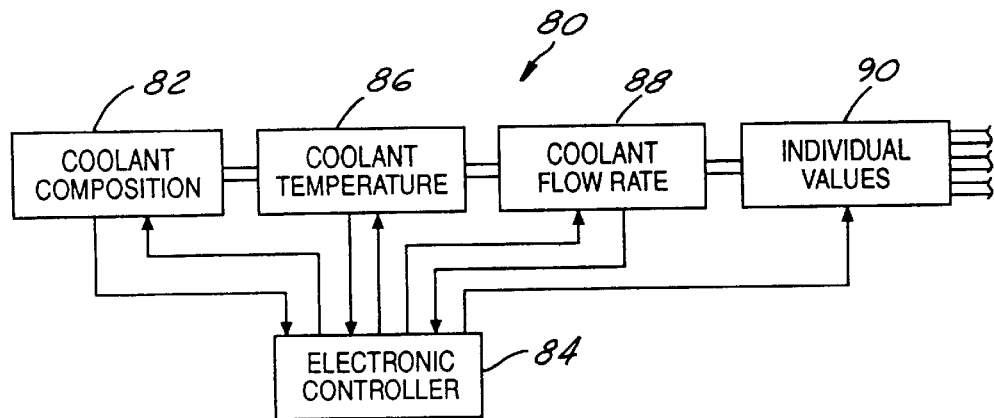
FIG. 21 is a functional block diagram of a fluid coolant control system in accordance with a presently preferred embodiment of the invention.

FIG. 21 illustrates a coolant circulation system 80 in accordance with one presently preferred implementation of the invention. Coolant in the presently preferred implementation of the invention comprises a mixture of propylene glycol and water. This mixture helps prevent corrosion, reduces heat transfer from the mold bodies, lubricates the pump, and helps reduce two-phase boiling in the mold coolant passages. Other coolants and blends of coolants may be used as dictated by environmental and other factors. The relative percentages of propylene glycol and water are controlled by a coolant composition control unit 82 under control of an electronic controller 84. Likewise, there is a coolant temperature control unit 86 for sensing coolant temperature, and for heating or cooling the coolant as required under control of controller 34. A coolant flow rate control unit 88 includes a variable output pump and suitable means for measuring coolant flow rate (and pressure if desired). Coolant may be fed from unit 88 to all mold segments connected in parallel, or may be fed through individually controllable valves 90 to the individual mold segments. Valves 90 are controlled by electronic controller 84. Thus, controller 84 receives indication of coolant composition form unit 82, coolant temperature from unit 86 and coolant flow rate (and pressure) from unit 88, and provides corresponding control signals to the composition, temperature and flow rate controllers. Controller 84 also provides suitable signals to the individual valves 90, which gives facility for controlling coolant flow to the molds individually. In any given application, one or more of the control units 82, 86, 88 and 90 may be deleted if desired.

There have thus been disclosed a mold, and a method for cooling a mold, for use in a glassware forming system, that fully satisfy all of the objects and aims previously set forth. Specifically, openings are provided in the mold body at a number, position, depth and content to control heat transfer between the mold surface and the coolant. This feature allows molds to be designed for specific temperature control and heat transfer characteristics. Further, control of coolant composition, temperature and/or flow rate provides dynamic control of mold surface temperature. Mold corrosion is reduced and operating life is extended. Several modifications and variations have been disclosed. Although the invention has been disclosed as being particularly useful in conjunction with individual section machines, the invention may be readily employed in conjunction with other types of glassware forming machines, such as rotary machines. Other modifications and variations will suggest themselves to persons of ordinary skill in the art. The invention is intended to embrace all such modifications and variations as fall within the spirit and a broad scope of the appended claims.

What is claimed is:

1. A glassware forming mold that comprises:
    at least one body of integrally formed heat conductive construction having a central portion with a forming surface for shaping molten glass and having a longitudinal mold axis, and a peripheral portion spaced radially outwardly of said central portion,
    a plurality of coolant passages that extend parallel to said mold axis and to each other in a circumferentially spaced array through said peripheral portion, each said passage having an inlet at an axial end of the mold body and an outlet at an axial end of the mold body for circulation of coolant through said passages, means for directing liquid coolant through said coolant passages for extracting heat from said body by conduction from said forming surface, and a plurality of cylindrical openings in said body that extend into said body parallel to said mold axis, parallel to each other and parallel to said coolant passages, each said opening extending from at least one axial end of said mold body, said openings being disposed radially between at least some of said coolant passages and said forming surface for retarding heat transfer from said surface to liquid coolant in said coolant passages.

2. The mold set forth in claim 1 wherein at least one of said openings has an axial depth into said body coordinated with contour of said forming surface to control heat transfer from said forming surface to coolant in said coolant passages.

3. The mold set forth in claim 1 wherein said at least one opening is a blind opening that extends part way into said body from an axial end of said mold body.

4. The mold set forth in claim 3 wherein said forming surface has a first portion for forming a container body and a second portion for forming a container neck, and wherein said blind opening has an axial depth disposed radially between said container body-forming portion of said forming surface and said coolant passages.

5. The mold set forth in claim 1 wherein at least one of said openings extends axially through said body and opens at axially spaced ends of said body.

6. The mold set forth in claim 1 further comprising means at least partially filling at least some of said openings so as to vary heat transfer radially across said at least one opening.

7. The mold set forth in claim 6 wherein said means fills a mid portion of said at least some of said openings, with the end portions of such openings being open at said axially spaced ends of said body.

8. The mold set forth in claim 7 wherein said at least some of said openings are internally threaded, and wherein said means comprises an externally threaded plug in said opening.

9. The mold set forth in claim 1 wherein said body has first and second axial end surfaces at which said coolant passages open, and wherein said means for directing liquid coolant comprises a first endplate on said first end surface and a second endplate on said second end surface, said endplates having means in alignment with said passage inlets and outlets for directing cooling fluid through said coolant passages.

10. The mold set forth in claim 9 wherein said first endplate comprises fluid inlet means for directing fluid into an end of one coolant passage, and fluid outlet means for receiving fluid from an end of another of said coolant passages.

11. The mold set forth in claim 9 further comprising means on one of said endplates for adjustably varying cross section of said fluid directing means to fluid flow.

12. The mold set forth in claim 1 comprising a split mold having a pair of said bodies having identical arrays of coolant passages and openings.

13. The mold set forth in claim 12 wherein said mold comprises a blow mold.

14. The mold set forth in claim 12 wherein said mold comprises a blank mold.

15. The mold set forth in claim 1 wherein said integrally formed body is of ductile iron.

16. The mold set forth in claim 15 wherein said ductile iron is an austenitic Ni-Resist ductile iron having a silicon content in excess of 3.0% and a molybdenum content in excess of 0.5%.

17. The mold set forth in claim 16 wherein said silicon content is 4.20±0.20%, and said molybdenum content is 0.70±0.10%.

18. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend from at least one axial end of said body axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface.

19. The mold set forth in claim 18 wherein said means for directing liquid coolant comprises means for controlling temperature of said coolant.

20. The mold set forth in claim 18 wherein said means for directing liquid coolant comprises means for controlling flow rate of said coolant.

21. The mold set forth in claim 18 wherein said means for directing liquid coolant comprises means for controlling composition of said coolant.

22. The mold set forth in claim 18 wherein said means for directing liquid coolant comprises means for controlling both temperature and flow rate of said coolant.

23. The mold set forth in claim 18 wherein said means for directing liquid coolant comprises means for controlling temperature, flow rate and composition of said coolant.

24. The mold set forth in claim 18 wherein said openings have a depth into said body coordinated with contour of said forming surface to control heat transfer from said forming surface to coolant in said coolant passages.

25. The mold set forth in claim 18 further comprising means at least partially filling at least some of said openings so as to vary heat transfer radially through said openings.

26. The mold set forth in claim 18 wherein said bodies are made of ductile iron.

27. The mold set forth in claim 18 wherein said mold comprises a blow mold.

28. The mold set forth in claim 18 wherein said mold comprises a blank mold.

29. A mold for a glassware forming machine that comprises at least one body having a central portion with a forming surface for shaping molten glass, and a peripheral portion spaced radially outwardly from said central portion, said body being of austenitic Ni-Resist ductile iron having a nickel content in excess of 18%, a silicon content in excess of 3.0% and a molybdenum content in excess of 0.5%.

30. The mold set forth in claim 29 wherein said silicon content is 4.20±0.20%, and said molybdenum content is 0.70±0.10%.

31. The mold set forth in claim 29 wherein said mold comprises a blow mold.

32. The mold set forth in claim 29 wherein said mold comprises a blank mold.

33. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface, including means for controlling temperature of said coolant.

34. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface, including means for controlling composition of said coolant.

35. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface, including means for controlling both temperature and flow rate of said coolant.

36. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface, including means for controlling temperature, flow rate and composition of said coolant.

37. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface, said openings having a depth into said body coordinated with contour of said forming surface to control heat transfer from said forming surface to coolant in said coolant passages.

38. The mold set forth in claim 37 wherein said openings are blind openings that extend part way into said body.

39. The mold set forth in claim 38 wherein said forming surface has a first portion for forming a container body and a second portion for forming a container neck, and wherein said openings have a depth disposed between said container body-forming portion of said forming surface and said coolant passages.

40. The mold set forth in claim 37 wherein said openings extend axially through said body.

41. A split mold for forming glassware in a glassware forming machine, which comprises:

a pair of mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, means at least partially filling at least some of said openings so as to vary heat transfer radially through said openings, and means for directing liquid coolant through said coolant passages for extracting heat from said bodies by conduction from said forming surface.

42. The mold set forth in claim 41 wherein said means fills mid portions of at least some of said openings.

43. The mold set forth in claim 42 wherein said opening is internally threaded, and wherein said means comprises an externallyeaded plug in said opening.

44. A split mold for forming glassware in a glassware forming machine, which comprises:

a pair of mold bodies of integrally formed heat conductive ductile iron construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface.

45. The mold set forth in claim 44 wherein said ductile iron is an austenitic Ni-Resist ductile iron having a silicon content in excess of 3.0% and a molybdenum content in excess of 0.5%.

46. The mold set forth in claim 45 wherein said silicon content is 4.20+0.20%, and said molybdenum content is 0.70±0.10%.

47. A split blow mold for forming glassware in a glassware forming machine, which comprises:

a pair of blow mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface.

48. A split blank mold for forming glassware in a glassware forming machine, which comprises:

a pair of blank mold bodies of integrally formed heat conductive construction, each of said bodies having a central portion that together define a glassware forming surface having a longitudinal mold axis, a peripheral portion spaced radially outwardly of said central portion, a plurality of coolant passages that extend parallel to said mold axis in a spaced array through said peripheral portion, and a plurality of cylindrical openings that extend axially into said body parallel to said coolant passages between at least some of said coolant passages and said forming surface for retarding heat transfer from said surface to said coolant passages, and means for directing liquid coolant through said coolant passages for extracting heat from said bodies by conduction from said forming surface.

* * * * *